United States Patent
Dommisse et al.

(12) 
(10) Patent No.: US 6,218,588 B1
(45) Date of Patent: Apr. 17, 2001

(54) AROMATIC MODIFIED ALIPHATIC HYDROCARBON RESINS GIVING AN EXCELLENT BALANCE BETWEEN TACK AND SHEAR PROPERTIES

(75) Inventors: Nicolaas Adriaan Dommisse, Yerseke; Christiaan Pieter Louis Charles Donker, Heinkenszand; Michael Hendrikus Theelen, Westapelle; Jacobus van Rijn, Middelburg; Gerard Arie Verrijzer, Lewedorp, all of (NL)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 09/246,283

(22) Filed: Feb. 8, 1999

(51) Int. Cl.[7] ........................... C08F 240/00; C09J 109/00
(52) U.S. Cl. ................ 585/12; 428/355 BL; 428/492; 524/483; 524/484; 525/99
(58) Field of Search ................ 585/12; 428/355 BL, 428/492; 525/99; 524/483, 484

(56) References Cited

U.S. PATENT DOCUMENTS

| | | |
|---|---|---|
| 3,846,352 | 11/1974 | Bullard et al. . |
| 4,959,412 * | 9/1990 | Arter et al. ................ 525/98 |
| 5,177,163 | 1/1993 | Chu et al. . |
| 5,502,140 | 3/1996 | Daughenbaugh et al. . |
| 5,714,254 * | 2/1998 | Jacob ........................ 428/355 BI |
| 5,853,874 * | 12/1998 | Jacob ........................ 428/343 |
| 6,106,939 * | 8/2000 | Donker et al. ............. 428/355 H |

FOREIGN PATENT DOCUMENTS

| | | |
|---|---|---|
| 0 794 202 A 1 | 10/1997 | (EP) . |
| 0936229A1 * | 8/1999 | (EP) . |
| 96/31573 * | 10/1996 | (WO) . |

* cited by examiner

Primary Examiner—Jacqueline V. Howard
(74) Attorney, Agent, or Firm—Robert P O'Flynn O'Brien; Martin F. Sloan

(57) ABSTRACT

The invention relates to aromatic modified aliphatic hydrocarbon resins giving excellent balance between tack and shear properties even at low coating weights. These resins are characterized in that they have a Ring and Ball (R&B) softening point of 94° C. or lower, a weight average molecular weight (Mw) of not more than 2000 Dalton, a Z-average molecular weight (Mz) of not more than 6000 Dalton and a mixed methylcyclohexane aniline cloud point (MMAP) between 25 and 45° C. The aromatic modified aliphatic hydrocarbon resins of the invention may be prepared by subjecting polymerization feeds containing petroleum feeds which comprise (a) C5 and C6 olefins and/or diolefins including cycloolefins, (b) aromatic monomers and (c) (di-) cyclodiolefins to a Friedel-Crafts polymerization. The invention is also directed to the use of the aromatic modified aliphatic hydrocarbon resins as mono-tackifiers in adhesive formulations as well as to an adhesive tape comprising these resins.

20 Claims, 2 Drawing Sheets

AROMATIC MODIFIED ALIPHATIC HYDROCARBON RESINS GIVING AN EXCELLENT BALANCE BETWEEN TACK AND SHEAR PROPERTIES

FIELD OF THE INVENTION

This invention relates to the field of aromatic modified aliphatic hydrocarbon resins. More specifically, this invention relates to aromatic modified aliphatic hydrocarbon resins giving excellent balance between tack and shear properties even at low coating weights.

BACKGROUND

Aromatic modified aliphatic hydrocarbon resins have been used in solvent based tape formulations (U.S. Pat. No. 4,250,272, U.S. Pat. No. 5,177,163, WO 91/07472). However, the tape industry has begun lowering coating weights so that new and optimized systems are required to comply with this trend. Lower coating weights decrease the tack properties of the adhesive, and the hydrocarbon resins must therefore be modified to maintain the desired adhesion strength.

U.S. Pat. No. 3,846,352 (Goodyear) discloses the use of cyclic diolefins in combination with 2-methyl-2-butene in the polymerization feed for the production of aliphatic hydrocarbon resins. Further, alpha-methylstyrene was used for aromatic modifications. However, the resin properties were not related to the adhesive behavior, so that no optimization according to the requirements at lower coating weights were carried out.

U.S. Pat. No. 4,104,327 and U.S. Pat. No. 4,636,555 disclose the use of alpha-methylstyrene and para-methylstyrene in the aromatic part of the feed for the production of aromatic modified aliphatic hydrocarbon resins, respectively.

In view of the above, the present invention aims to provide novel aromatic modified aliphatic hydrocarbon resins with excellent tack and shear properties even at low coating weights. It is also an object of the invention to provide a method for the preparation of such aromatic modified aliphatic hydrocarbon resins. A further object of the invention is the use of the aromatic modified aliphatic hydrocarbon resins as mono-tackifiers in solvent based tape formulations. The invention further aims to provide an adhesive tape comprising the aromatic modified aliphatic hydrocarbon resin of the invention.

SUMMARY OF THE INVENTION

It was surprisingly found that the first object, which is the provision of an aromatic modified aliphatic hydrocarbon resin with excellent tack and shear properties even at low coating weights, can be attained by aromatic modified aliphatic hydrocarbon resins, comprising a resin having a Ring and Ball (R&B) softening point of 94° C. or lower, a weight-average molecular weight (Mw) of not more than 2000 Dalton, a Z-average molecular weight (Mz) of not more than 6000 Dalton and a mixed methylcyclohexane aniline cloud point (MMAP) between 25 and 450° C.

The aromatic modified aliphatic hydrocarbon resins showing the above parameters can be obtained by a method comprising the steps of obtaining polymerization feeds containing petroleum feeds comprising (a) C5 and C6 olefins and/or diolefins including cycloolefins, (b) aromatic monomers and (c) (di)cyclo-diolefins, subjecting the polymerization feeds to Friedel-Crafts-polymerization, and wherein said C5 and C6 olefins and/or diolefins including cycloolefins and the aromatic monomers are used in an amount so that the resin has an MMAP between 25 and 45° C.;

and said (di-) cyclodiolefins are used in an amount so that the resin has an Mw of not more than 2000 Dalton and an Mz of not more than 6000.

DETAILED DESCRIPTION

Figure 1:
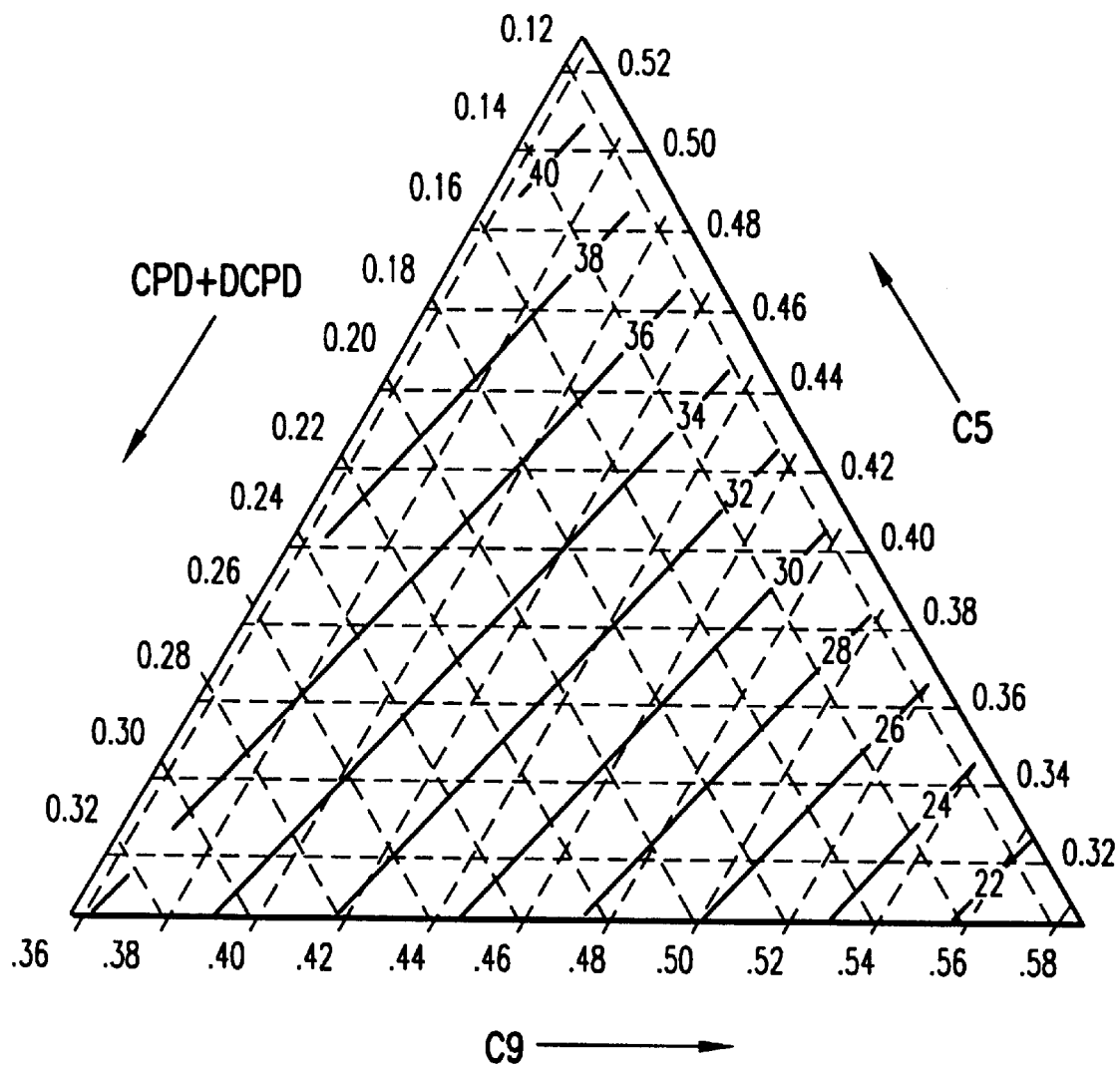
FIG. 1 is a contour plot showing the influence of the composition of the feed on the MMAP cloud point.

It was surprisingly found by the inventors that excellent tack and shear properties of aromatic modified aliphatic hydrocarbon resins can be obtained by individually controlling the R&B softening point, the weight-average molecular weight (Mw), the Z-average molecular weight (Mz) and the mixed methylcyclohexane aniline cloud point (MMAP) of the resin. Aromatic modified aliphatic hydrocarbon resins having the following values exhibit satisfactory tack and shear properties:

a Ring and Ball (R&B) softening point of 94° C. or lower, preferably from 75 to 94° C.;

a weight-average molecular weight (Mw) of not more than 2000 Dalton, preferably from 1000 to 2000 Dalton, most preferably from 1200 to 2000 Dalton;

a Z-average molecular weight (Mz) of not more than 6000 Dalton, preferably from 2500 to 6000 Dalton, more preferably from 3000 to 5000 Dalton, and most preferably from 3000 to 4000 Dalton; and a mixed methylcyclohexane aniline cloud point (MMAP) between 25 and 45° C., preferably from 30 to 40° C.

It was found that the softening point had a great effect on the adhesion properties. Adhesion was improved by lowering the R&B softening point. The improved adhesion was observed by a lower rolling ball tack value. Especially at lower coating weights (about 15 g/cm$^2$) it was found that softening points of 94° C. or lower resulted in very desirable rolling ball tack values (<5 cm). Generally, the rolling ball tack values increased when the coating weight of the resin was lowered.

It was also found that an increase of the Mz and Mw molecular weights increased the cohesion of the adhesive system, as was observed from a better shear to steel at 400° C.

The R&B softening point in combination with the desired molecular weight ranges resulted in an optimal balance between adhesion and cohesion properties. Cardboard properties appeared to be effected by both R&B softening point and the molecular weights. In the desired R&B softening point and molecular weight ranges for rolling ball tack and shear to steel at 40° C., the adhesives also showed sufficient cardboard properties (shear and flaptest).

The balance between non-aromatic components and the aromatic monomers in the aromatic modified aliphatic hydrocarbon resins mainly determines the MMAP cloud point. A method for measuring the MMAP cloud point is described further below.

The aromatic modified aliphatic hydrocarbon resins of the present invention are obtainable by subjecting polymerization feeds to Friedel-Crafts-polymerization. Said polymerization feeds usually include a mixed petroleum feed and a diluent. The petroleum feed preferably comprises (a) C5 and C6 olefins and/or diolefins including cycloolefins, preferably in an amount of 45 wt % +/−25 wt %, (b) aromatic monomers, preferably in an amount of 40 wt % +/−20 wt %, and (c) (di-)cyclodiolefins, preferably in an amount of 20 wt % +/−10 wt %.

In a particularly preferred embodiment of the invention, (a) is an isoprene or an isoprene-rich piperylene stream, (b) a methylindene-rich stream and (c) a (di-)cyclodiolefin.

The aromatic modified aliphatic hydrocarbon resin of the present invention may be preferably produced by a polymerization process, wherein the C5 and C6 olefins and/or diolefins including cycloolefins (a) and the aromatic monomers (b) are used in an amount so that the resin has an MMAP between 25 and 45° C., and the (di-)cyclodiolefins are used in an amount so that the resin has an Mw of not more than 2000 Dalton and an Mz of not more than 6000 Dalton.

In a particularly preferred embodiment, chain transfer agents are added to the (di-)cyclodiolefins in an amount so that the resin has an Mw of not more than 2000 Dalton and an Mz of not more than 6000 Dalton.

Additionally, further lower molecular weight oligomers may be added to the resin so that the resin has an R&B softening point of 94° C. or less.

The polymerization feeds of this invention preferably comprise about 20 to 60 wt %, more preferably 30 to 50 wt %, of the mixed petroleum feed streams, 0 to 20 wt % chain transfer agent and 40 to 80 wt % of a diluent, preferably an aromatic diluent, most preferably toluene or plant recycled diluent, mainly consisting of trimethylbenzenes and their isomers. A suitable polymerization feed preferably contains between 30 and 50 wt % and more preferably between 35 and 45 wt % of polymerisable monomers so that the ultimate resin yield on total feed will be between 30 and 50 wt %.

More particularly, the petroleum feeds are preferably built up from mainly three kinds of components.
(a) One part of the feed streams essentially consists of unsaturated hydrocarbons like C5 and C6 olefins and/or diolefins, including cycloolefins, boiling in the range from 20 to 100° C., preferably from 30 to 70° C. Examples of aliphatic C5 and C6 diolefins are: 1-pentene, trans- and cis-2-pentene, trans- and cis-piperylene, 1,4-pentadiene, isoprene, 1,3-hexadiene and 1,4-hexadiene, and cycloolefins like cyclopentene and cyclohexene.

Most preferably used feed streams for these monomers are commercially available piperylene feed streams. Their main components are trans- and cis-piperylene. Isoprene streams and crude piperylene streams can also be used.
(b) The aromatic part of the feeds comprises styrene, alpha-methylstyrene, vinyltoluenes, para-methylstyrene, divinylbenzene, (t-)butylstyrene, indene, methylindenes, and mixtures of these.

Most preferably used feed streams for the aromatic monomers are commercially available resin oils mainly consisting of vinyltoluenes and indene as monomers. High boiling range resin oils can also be used. They contain mainly indene and methylindenes. Pure monomer streams can also be used and mixed to the desired composition.
(c) The feeds further contain cyclodiolefins and dicyclodiolefins. Examples of these components are cyclopentadiene, dicyclopentadiene, methyl and ethyl substituted homologues of both components, codimers of cyclopentadiene and the diolefins.

These monomers can originate from (crude) piperylene and isoprene streams, but these streams are generally heated at temperatures between 100 and 160° C. followed by distillation to remove cyclopentadiene and dicylopentadiene. Commercially available dicyclopentadiene streams can be used for the desired amount of cyclodiolefines in the feed.

A particularly preferred representative feed stream generally consists of about 35 to 45 wt % active components (=monomers) with the following composition:

C5 and C6 olefins and diolefins: 45 wt % +/−25 wt % aromatic monomers: 40 wt % +/−20 wt %

(di)-cyclodiolefins: 20 wt % +/−10 wt % chain transfer agents: 0 to 20 wt %

The exact amounts can be adjusted in the following way to reach the desired resin properties, which determine the adhesive properties of the tape based adhesive formulations.

The balance between the C5 and C6 olefins and/or diolefins and the aromatic monomers may be used to adapt the MMAP cloud point. The feed compositions are mixed in such a way that the MMAP cloud point of the resins is between 25 and 45° C., preferably between 30 and 40° C. The MMAP cloud point is an indication for the compatibility to aromatic solvents.

FIG. 1 shows a contour plot that was obtained from a ternary mixture design of the feed components C5 (diolefines and olefines, component (a)), C9 (aromatic monomers, component (b)), and CPD+DCPD (cyclodiolefines, component (c)) as fractions of the total monomer content. It illustrates the effect of the three main types of components on the MMAP cloud point. A 10% addition of the amount of C5, while holding the relative ratio amounts of the other fractions constant, gives an increase of the MMAP of 7.4° C. A similar increase in the amount of cyclodiolefines induces a smaller increase (2.6° C.), while increasing the C9 content in the same way results in a strong decrease (−8.7° C.).

The amount of dicyclodiolefins and cyclodiolefins has an impact on the molecular weight parameters of the resin. Higher molecular weight parameters produce better cohesion strength, and in turn, higher and better shear values on steel at 40° C. It was found that Mz's in the range of not more than 6000 Dalton are required for a sufficient cohesion strength. An Mz of not more than 4000 Dalton assures an optimum adhesion behaviour.

Figure 2:
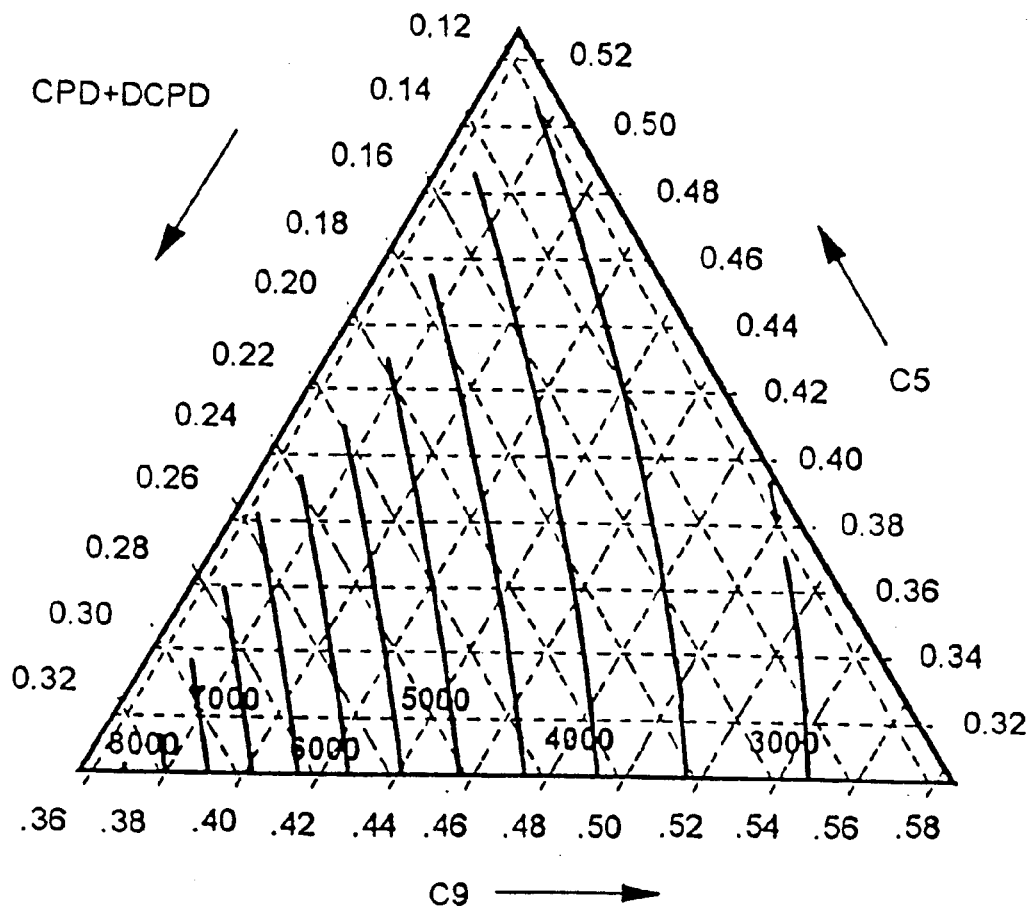
FIG. 2 is a contour plot showing the influence of the composition of the feed on the Z-average molecular weight.

The contour plot of FIG. 2 was obtained from the same design as the previous one. This plot illustrates the effects of the three main types of components on the Mz molecular weight parameter of the resins. The (di-)cyclodiolefin fraction has a large increasing effect, while the C9 fraction has a small decreasing effect. The C5 fraction has no significant effect. The (di-)cyclodiolefin content is the main parameter controlling the Mz value, especially upwards, for this feed combination, where no chain transfer agent was used, which can be used to control the Mz value downwards. The weight-average molecular weight (Mw) shows the same trend as z-average molecular weight (Mz).

Furthermore, chain transfer agents can be used to obtain resins with a lower and narrower molecular weight distribution. Examples of the chain transfer agents include 1-pentene, trans- and cis-2-pentene, trans- and cis-piperylene, 1,4-pentadiene, isoprene, 1,3-hexadiene and 1,4-hexadiene, cycloolefins like cyclopentene and cyclohexene, isobutylene, 2-methyl-1-butene, 2-methyl-2-butene, or dimers and oligomers thereof. Especially when the amount of cyclodiolefins and dicyclodiolefins in the piperylene or isoprene streams are high, the molecular weight parameters can be decreased by adding the chain transfer agents. The components can be applied in pure or diluted form to a solvent like toluene or unreactive C4 to C6 hydrocarbons.

A diluent is desirable because the polymerization reaction is very fast and highly exothermic. The diluent is however not necessary when the reaction can be controlled by adequate stirring and cooling. The diluent used for the polymerizations are built up of inert or less active components. They may be paraffinic in nature, like pentane, hexane, heptane, cyclopentane, olefinic in nature like cyclopentene, 2-pentenes, or aromatic in nature, like toluene, trimethylbenzenes, or be a mixture of paraffinic, olefinic and aromatic components. Unreacted hydrocarbons from the reactions can also be used after they are recycled.

The catalyst for the polymerization is preferably used in an amount from 1.0 to 8.0 wt % based on the amount of polymerizable components in the polymerization feed. The exact amount of catalyst used depends on the desired resin. The catalyst can be chosen from any suitable Friedel-Crafts catalyst, such as aluminum trichloride, aluminum bromide, titanium tri- and tetrachloride, tin tetrachloride, boron trifluoride, or solutions, slurries or complexes thereof. The catalyst may also be used on solids or as supported catalyst. The most preferred catalyst is a liquefied $AlCl_3$ complex containing about 50 wt. % $AlCl_3$ and added at a level of 1.5 wt. % $AlCl_3$ to monomers.

Polymerization temperatures are usually between 0 and 120° C., preferably in the range from 20 to 80° C. and most preferably in the range of from 40 to 60° C.

The polymerization can be carried out in a continuous or semi-continuous process or in a batch mode. The reaction time may take place within a few seconds or up to 24 hours. More typical reaction times are from 1 to 4 hours.

After the polymerization and a possible quenching step the residues of the catalyst and the quenching agent can be removed by, for example, addition of and extraction with water.

The polymer-solvent mixtures obtained in this manner are usually stripped to remove unreacted hydrocarbons, diluent and at least part of the low molecular weight oligomers. The stripping process can be carried out selectively in such a way that a part of the lower molecular weight oligomers remains in the resin. Low molecular weight oligomers can also be added afterwards to soften the resin. The potential softening point (the softening point of the resin after all oligomers have been stripped off) is preferably higher than 94° C. By the presence or addition of lower molecular weight oligomers, the desired actual R&B softening point can then be adjusted to a value of 94° C. or less.

It was also found that the composition of the aromatic part of the polymerization feed influences the potential R&B softening point, and is therefore preferably adjusted depending on the piperylene or isoprene stream used. It was found that the use of isoprene, or isoprene rich piperylene streams lowers the potential softening point. Adjusting the composition, the aromatic part compensated for the decreased R&B softening point. It was found that especially an aromatic part rich in methylindenes resulted in higher potential softening points. A preferred embodiment of the method of the present invention therefore uses feeds which comprise isoprene or isoprene-rich piperylene stream as component (a), a methylindene-rich stream as component (b) and a (di)cyclodiolefin as component (c).

The present invention further provides for the use of the aromatic modified aliphatic hydrocarbon resins of the present invention as mono-tackifiers in adhesive formulations. The term "mono-tackifier" means that only one resin is used in the adhesive formulation. The adhesive formulation is preferably a solvent based adhesive formulation, a hot-melt or a water-based dispersion. Adhesives of the present invention comprise an aromatic modified aliphatic hydrocarbon resins of the present invention and a polymer. The polymer may be any polymer selected from the group consisting of styrene isoprene styrene block copolymers (SIS) styrene butadiene styrene block copolymers (SBS), natural rubber and acrylics.

Possible applications of aromatic modified aliphatic hydrocarbon resins also include water-based tapes, labels and ethylene-vinylacetate copolymer (EVA) based hotmelts.

Further, the present invention provides an adhesive tape comprising the aromatic modified aliphatic hydrocarbon resins of the present invention.

A particularly preferred tackifier (Resin 1) for the use as mono-tackifier in solvent-based tape formulations has the following typical properties:

| | |
|---|---|
| R&B Softening point (° C.) | 93.0 |
| MMAP (° C.) | 37 |
| Mn (Dalton) | 806 |
| Mw (Dalton) | 1595 |
| Mz (Dalton) | 3333 |

The resin was prepared by softening a resin which had been stripped to the potential softening point with 5 wt % of its oligomers (see example 1).

The adhesive performance of this resin was evaluated by mixing the resin with a natural rubber (0.9:1 parts by weight) and a toluene/hexane blend, so that the solid content of the mixture was approximately 25%.

Tapes were prepared by applying dissolved di-isocyanate to an E-PVC substrate as a primer and an intermediate layer to give better anchorage. Then, the resins were crosslinked with the di-isocyanate to the substrate, as is usually done in the industry, at a coating weight of approximately 20 and 15 $g/cm^2$.

The test results are given below.

| | 20 $g/cm^2$ | 15 $g/cm^2$ |
|---|---|---|
| Rolling ball tack (cm) | 2.8 | 5.0 |
| Shear to steel at 40° C. (2.5 kg, minutes) | 569 | 3146 |
| Shear to cardboard at 40° C. (1.0 kg, minutes) | 315 | 296 |
| Flaptest to cardboard at 23° C. (1.0 kg, minutes) | 472 | 782 |

The invention is illustrated by the following Examples and Procedures, these are provided for the purpose of representation, and not to be construed as limiting the scope of the invention, unless stated otherwise, all percentages, parts, etc. are by weight.

EXAMPLES

Experimental Section

Method for the Preparation of the Resins:

All resins mentioned in the examples were prepared in a continuous way, but batch-wise or semi-continuous preparation would also be possible. The resin feed was dried over calcium chloride and molecular sieves and was added together with the chain transfer agent at a rate of 1500 ml/h to a tank reactor of 5 liter and stirred continuously. The catalyst was simultaneously added, and the mixture was circulated from the bottom of the reactor to the catalyst inlet point. The level in the reactor was kept at 3 liter by continuously removing polymerizate, so the overall average reaction time for all experiments was 2 hours. The mixture was deactivated using water and washed in three steps with water before it was stripped under vacuum and with steam to remove the solvent and low molecular weight material.

Method for the Determination of the R&B Softening Point:

The R&B softening point was determined according to ASTM D-36–70 with the Walter Herzog R&B apparatus, model MC-735.

Method for the Determination of the MMAP:

The MMAP (Mixed Methylcyclohexane Aniline Point) was determined using a modified ASTM D-611-82 procedure. The Methylcyclohexane is substituted for the heptane used in the standard test procedure. The procedure uses resin/aniline/methylcyclohexane in a ratio 1/2/1 (5 g/10 ml/5 ml), and the cloud point is determined by cooling a heated, clear blend of the three components until a complete turbidity just occurs.

Method for the Determination of the Molecular Weights:

The molecular weights Mn, Mw, Mz and the polydispersity (=Mw/Mn) were determined by size exclusion chromatography using a refractive index detector. Calibration was done using narrow-distributed polystyrene standards.

Method for the Determination of the Ball Tack:

Ball tack is measured by Pressure Sensitive Tape Counsil (PSTC)-6 test.

Method for the Determination of the Shear Strengths:

The shear strengths were measured by PSTC-7 test.

Method for the Determination of the Cardboard Properties:

The cardboard properties of the tapes are tested by placing the samples on a cardboard strip. A weight is hung on the tape and the time to failure is noted.

Uses/Definitions

Materials used in preparing the adhesive compositions as mentioned in the examples are as follows:

Regular piperylene 50: a piperylene concentrate available from Shell, Pernis (NL). Composition see below.

Crude piperylene: a crude piperylene concentrate available from DOW, Terneuzen (NL). Composition see below.

C9 HBR high-boiling resin oil: a resin oil available from DSM, Geleen (NL), consisting mainly of indene and methylindenes. Composition see below.

Regular C9 classic resin oil: a resin oil available from DSM, Geleen, consisting mainly of vinyltoluenes and indene. Composition see below.

DCPD 91 concentrate: a dicyclopentadiene concentrate of 91% purity available from Shell, Pernis (NL).

Isoprene 65: an isoprene stream from Shell, Pernis. Composition see below.

Samples of the typical compositions of the various feed streams and plant recycled solvent are given below. The resins of the following examples were prepared from these various feed streams, however, the actual compositions may vary slightly from the value listed below.

| Stream | isoprene | crude pip | regular pip | regular C9 | HBR C9 | Solv. |
|---|---|---|---|---|---|---|
| C4's | | 0.7 | | | | |
| isopentane | 0.1 | 10.4 | | | | |
| 1-pentene | 5.1 | 3.7 | | | | |
| 2-methyl-1-butene | 10.6 | 5.1 | | | | |
| n-pentane | 16.7 | 15.6 | | | | 0.1 |
| isoprene | 63.9 | 17.6 | 0.5 | | | 0.0 |
| trans-2-pentene | 2.4 | 2.5 | 0.9 | | | 0.6 |
| cis-2-pentene | 0.4 | 1.4 | 1.9 | | | 0.5 |
| isoamylene | | 2.9 | 5.6 | | | 0.1 |
| t-piperylene | | 6.0 | 33.2 | | | 0.1 |
| c-piperylene | | 11.8 | 18.7 | | | 0.5 |
| cyclopentene | | 3.5 | 13.4 | | | 2.4 |
| cyclopentane | | 3.1 | 3.8 | | | 6.9 |
| cyclopentadiene | | 1.2 | 4.7 | | | 0.2 |
| dicyclopentadiene | | 8.1 | 9.4 | 0.4 | | 1.4 |
| other C5 + C6's | 0.7 | 6.1 | 4.4 | 0.2 | | 3.8 |
| toluene | | | | 0.1 | | 1.3 |
| C9 light ends* | | | | 0.7 | 0.1 | 4.2 |
| styrene | | | | 2.4 | 0.4 | 0.1 |
| alpha-methyl-styrene | | | | 3.9 | 0.4 | |
| vinyltoluenes | | | | 21.5 | 2.8 | 0.7 |
| indene | | | | 27.3 | 12.0 | 0.2 |
| methyl indenes | | | | 5.3 | 42.6 | 0.5 |
| trimethyl-benzenes** | | | | 28.2 | 6.0 | 69.4 |
| tetralines*** | | | | 8.0 | 20.9 | 3.8 |
| naphthalene | | | | 1.9 | 14.7 | 2.0 |
| heavy ends**** | | | | 0.2 | 0.2 | 1.4 |

*C9 light ends: all components eluting between toluene and styrene
**trimethylbenzenes: all not-designated components eluting between styrene and indene
***tetralines: all not-designated components eluting between indene and naphthalene
****heavy ends: all components eluting after naphthalene All tapes were coated at about 20 g/cm² except for the results in example 1.c, where some tapes were coated at about 15 g/cm2.

Example 1—Softening Point

Example 1.a. Oligomers Added after the Resin is Stripped to Potential R&B, Effect of R&B on Tack Properties.

The table below illustrates what happens to the resin properties and the adhesive properties when low molecular weight oligomers are added after the resin has been stripped to the potential softening point. Stripped to potential is defined as being stripped until the water condensate of a steam strip at 220° C. contains 2 wt % or less organic fraction.

The oligomers were liquid, having an MMAP of 18° C., an Mn value of 256 Dalton, an Mw of 358 Dalton and an Mz of 832 Dalton.

| Experiment | Resin 1 | Resin 2 | Resin 3 |
|---|---|---|---|
| Oligomers (wt % per resin) | 0 | 5 | 10 |
| R&B (° C.) | 97.0 | 93.0 | 86.5 |
| MMAP (° C.) | 37 | 37 | 36 |
| Color (Gardner) | 6.3 | 7.1 | 6.9 |
| Mn (Dalton) | 867 | 806 | 746 |
| Mw (Dalton) | 1642 | 1595 | 1577 |
| Mz (Dalton) | 3342 | 3333 | 3586 |
| Rolling ball tack (cm) | 5.0 | 2.8 | 2.2 |
| Shear to steel at 40° C. (2.5 kg, minutes) | 791 | 569 | 728 |
| Shear to cardboard at 40° C. (1.0 kg, minutes) | 252 | 315 | 210 |
| Flaptest to cardboard at 23° C. (1.0 kg, minutes) | 883 | 472 | 305 |

The table clearly shows the effect of the oligomer addition on the resin properties. The R&B softening point is decreased by adding oligomers. The effect on the adhesive properties indicates the importance of the softening point on the rolling ball tack value. The lower the softening point, the better the rolling ball tack. This example shows that a resin having a softening point of more than 94° C. may be used to provide a resin with a softening point in the desired range of 94° C. or less by adding low molecular weight oligomers.

Example 1.b. Several Examples of the Selective Stripping, Potential R&B's Compared to Partially Stripped R&B's.

Oligomers can also be left in the resin during stripping. The table below illustrates the selective stripping with two examples.

| Experiment | Resin 4 | Resin 4 stripped to pot. | Resin 5 | Resin 5 stripped to pot. |
|---|---|---|---|---|
| R&B (pot:potential; p.s.:partially stripped) | p.s. (approx. 4.5 wt. % oligos) | pot. | p.s. (approx. 6.5 wt. % oligos) | pot. |
| R&B (° C.) | 94.0 | 102.0 | 88.0 | 97.0 |
| MMAP (° C.) | 30 | 30 | 31 | 31 |
| Color (Gardner) | 9.9 | 9.8 | 9.3 | 9.4 |
| Mn (Dalton) | 607 | 645 | 581 | 624 |
| Mw (Dalton) | 1252 | 1263 | 1165 | 1239 |
| Mz (Dalton) | 3432 | 3189 | 3237 | 3505 |
| Rolling ball tack (cm) | 2.4 | 6.4 | 1.8 | 3.6 |
| Shear to steel at 40° C. (2.5 kg, minutes) | 908 | 3472 | 731 | 1167 |
| Shear to cardboard at 40° C. (1.0 kg, minutes) | 702 | 258 | 656 | 156 |
| Flaptest to cardboard at 23° C. (1.0 kg, minutes) | 260 | 945 | 148 | 1078 |

The potential softening points are higher than the softening point of partially stripped resins. In the case of partially stripped resins the R&B was kept at or below 94° C.

The adhesive performance indicates similar effects as seen in example 1.a. Rolling ball tack improved at lower softening points. Shear to steel at 40° C. also showed a decrease, but the two lower softening point samples still resulted in sufficient values.

Example 1.c. Several Examples of Different Coating Weights.

Several samples were coated at about 20 g/cm² and at about 15 g/cm². The results were compared in the next table.

| Experiment | Resin 1 | Resin 2 |
|---|---|---|
| R&B (° C.) | 97.0 | 93.0 |
| MMAP (° C.) | 37 | 37 |
| Color (Gardner) | 6.3 | 7.1 |
| Mn (Dalton) | 867 | 806 |
| Mw (Dalton) | 1642 | 1595 |
| Mz (Dalton) | 3342 | 3333 |

|  | Resin 1 | | Resin 2 | |
|---|---|---|---|---|
| Coating weight (g/cm2) | 20 | 15 | 20 | 15 |
| Rolling ball tack (cm) | 5.0 | 6.4 | 2.8 | 5.0 |
| Shear to steel at 40° C. (2.5 kg, minutes) | 791 | 3079 | 569 | 3146 |
| Shear to cardboard at 40° C. (1.0 kg, minutes) | 252 | 517 | 315 | 296 |
| Flaptest to cardboard at 23° (1.0 kg, minutes) | 883 | 959 | 472 | 782 |

The results clearly show that lowering the coating weight resulted in an increase (worse) in the rolling ball tack value. In this example, an R&B softening point of about 93° C. or lower resulted in a rolling ball tack value of below the 5 cm. Other properties were not negatively effected.

Example 2—Molecular Weight Distribution

Example 2.a. Effect of Molecular Weights (Mz and Mw) on Shear Properties.

The table below illustrates the effect of the molecular weight parameters on the cohesive strength, thus the shear properties of the resin. Two samples were selected with a similar and comparable R&B softening point.

| Experiment | Resin 2 | Resin 6 |
|---|---|---|
| R&B (° C.) | 93.0 | 92.4 |
| MMAP (° C.) | 37 | 37 |
| Color (Gardner) | 7.1 | 8.0 |
| Mn (Dalton) | 806 | 629 |
| Mw (Dalton) | 1595 | 1035 |
| Mz (Dalton) | 3333 | 1947 |
| Rolling ball tack (cm) | 2.8 | 2.2 |
| Shear to steel at 40° C. (2.5 kg, minutes) | 569 | 208 |
| Shear to cardboard at 40° C. (1.0 kg, minutes) | 315 | 226 |
| Flaptest to cardboard at 23° C. (1.0 kg, minutes) | 472 | 189 |

As can been seen in the table, the rolling ball tack values were within the desired range due to their R&B softening points. The rolling ball tack value was hardly affected by the molecular weight parameters of the resin in this example.

The shear to steel at 40° C., to cardboard at 40° C. and the flaptest tended to increase together with increasing molecular weights. The molecular weight parameters seem to be important for advantageous cohesion strengths.

Example 2.b. Several Examples of (D)CPD on MWD Parameters.

Like the contour plot in FIG. 2, the table below illustrates how the molecular weight parameters can be controlled and increased by the cyclodiolefins and dicyclodiolefins. In the table below and further the C5 and C6 olefins and diolefins including the cycloolefins fraction on total monomers are given as the aliphatics. The amount of aromatic monomers on total monomers are given by aromatics, and the amount of dicyclodiolefins and cyclodiolefins on total monomers are given by the fraction cyclic diolefins. The softening points which are given are the potential softening points.

| Experiment | Resin 7 | Resin 8 | Resin 9 |
|---|---|---|---|
| allphatics | 0.50 | 0.46 | 0.43 |
| aromatics | 0.41 | 0.39 | 0.37 |
| cyclic diolefins | 0.09 | 0.15 | 0.20 |
| R&B (° C.) | 86.0 | 91.7 | 97.0 |
| MMAP (° C.) | 34 | 32 | 35 |
| Color (Gardner) | 7.9 | 8.0 | 8.0 |
| Mn (Dalton) | 628 | 626 | 680 |
| Mw (Dalton) | 1127 | 1145 | 1299 |
| Mz (Dalton) | 2395 | 2613 | 3099 |
| Rolling ball tack (cm) | 2.2 | 2.6 | 4.0 |
| Shear to steel at 40° C. (2.5 kg, minutes) | 96 | 139 | 364 |
| Shear to cardboard at 40° C. (1.0 kg, minutes) | 94 | 282 | 161 |
| Flaptest to cardboard at 23 ° C. (1.0 kg, minutes) | 87 | 170 | 273 |

Here, more cyclic diolefins in the feed resulted in higher potential R&B softening points and molecular weight parameters (Mw and Mz). The effect of the R&B softening point on the rolling ball tack was observed and found to be the same as in example 1. The effect of the molecular weight parameters on the shear to steel at 40° C. was observed to increase shears as seen in example 2.a. Flaptest and shear to cardboard also increased. Resin 8 and Resin 9 showed however reasonable cohesion strength and showed increasing shears and flaptests with increasing molecular weights. Only the shear to cardboard at 40° C. for Resin 9 showed a deviation.

Example 3—Effects of the Different Feed Streams

Example 3.a. Use of Crude C5/Isoprene Compared to Regular Pip.

The table below shows the effects of using an isoprene stream and an isoprene rich piperylene stream (crude piperylene) compared to the use of a regular piperylene stream, together with a regular resin oil for the aromatic part of the polymerization feed. The given R&B softening points are all potential softening points.

| Experiment | Resin 10 | Resin 11 | Resin 12 |
|---|---|---|---|
| regular piperylene | 26.7 | | |
| crude piperylene | | 32.4 | |
| isoprene 65 | | | 24.1 |
| regular C9 resin oil | 30.0 | 30.0 | 34.8 |
| diluent | 43.3 | 37.6 | 41.1 |
| R&B (° C.) | 92.2 | 89.4 | 86.0 |
| MMAP (° C.) | 30 | 30 | 30 |
| Color (Gardner) | 6.7 | 6.9 | 6.5 |
| Mn (Dalton) | 638 | 646 | 661 |
| Mw (Dalton) | 1183 | 1393 | 1325 |
| Mz (Dalton) | 3286 | 4605 | 4451 |

It is shown that the R&B softening point decreased and the molecular weight parameters increased when a more isoprene rich feed was used.

Using the combination of regular C9 resin oil and isoprene or isoprene-rich piperylene, it was not possible in this example to obtain resins with potential R&B softening points of more than 94° C. which is preferred according to the present invention. Potential R&B softening points of more than 94° C. allow to control the R&B softening points by selective stripping or oiling down with oligomers afterwards.

Example 3.b. Use of C9 HBR Together With Regular Piperylene.

The next table illustrates the softening point increasing effect of a methylindenes rich resin oil (C9 HBR) using regular piperylene.

The given R&B softening points are potential softening points.

| Experiment | Resin 10 | Resin 13 |
|---|---|---|
| regular piperylene | 26.7 | 25.8 |
| regular C9 resin oil | 30.0 | |
| HBR C9 resin oil | | 28.1 |
| diluent | 43.3 | 46.1 |
| R&B (° C.) | 92.2 | 107.0 |
| MMAP (° C.) | 30 | 35 |
| Color (Gardner) | 6.7 | 8.2 |
| Mn (Dalton) | 638 | 729 |
| Mw (Dalton) | 1183 | 1505 |
| Mz (Dalton) | 3286 | 3813 |

The table clearly shows that the C9 HBR resin oil results in a considerable higher potential R&B softening point, while the molecular weight parameters are comparable. It is much easier to control the R&B softening point for Resin 13 by selective stripping or oiling down with oligomers afterwards.

Example 3.c. Use of C9 HBR Together With Crude C5

The table below illustrates the effect of the methylindenes rich C9 HBR resin oil when using it together with a crude piperylene stream which is rich in isoprene (see composition of the feed streams). The R&B softening points were all stripped to potential.

| Experiment | Resin 11 | Resin 14 | Resin 15 |
|---|---|---|---|
| crude piperylene | 32.4 | 31.0 | 38.0 |
| regular C9 resin oil | 30.0 | | |
| HBR C9 resin oil | | 25.3 | 24.0 |
| diluent | 37.6 | 43.7 | 38.0 |
| allphatics | 0.36 | 0.34 | 0.32 |
| aromatics | 0.44 | 0.47 | 0.44 |
| cyclic diolefins | 0.20 | 0.19 | 0.24 |
| R&B (° C.) | 89.4 | 100.4 | 100.2 |
| MMAP (° C.) | 30 | 32 | 30 |
| Color (Gardner) | 6.9 | 7.6 | 7.1 |
| Mn (Dalton) | 646 | 712 | 721 |
| Mw (Dalton) | 1393 | 1605 | 1348 |
| Mz (Dalton) | 4605 | 5041 | 3088 |

The results of this example given in the table show that the methylindenes-rich C9 HBR resin oil causes a 10° C. higher potential softening point. The control of the softening point by selective stripping or oiling down afterwards becomes much easier. It thus is possible to use isoprene or isoprene-rich piperylene streams for the desired resin properties.

Example 4—Use of Additional Chain Transfer Agent

Example 4.a. Use of Additional Chain Transfer Agent in Case the Crude Piperylene Contains too much (di)-Cyclodiolefins.

In case a crude piperylene stream contains a large amount of dicyclodiolefins and cyclodiolefins, the molecular weight parameters become high and the adhesive formulation becomes harder. A preferred value for Mz which is below 5000 Dalton can be adjusted by using an additional amount of chain transfer agent. The amount of chain transfer agent is given in the following table as a fraction of total monomers as C4's. In this case pure isobutylene was used. The given softening points were stripped to potential softening points.

| Experiment | Resin 16 | Resin 17 |
|---|---|---|
| crude piperylene | 36.4 | 36.4 |
| HBR C9 resin oil | 27.0 | 27.0 |
| diluent | 26.7 | 26.7 |
| addition isobutylene | | 3.0* |
| C4's | | 0.08 |
| allphatics | 0.36 | 0.31 |
| aromatics | 0.44 | 0.42 |
| cyclic diolefins | 0.20 | 0.19 |
| R&B (° C.) | 101.3 | 99.1 |
| MMAP (° C.) | 32 | 35 |
| Color (Gardner) | 7.8 | 7.7 |
| Mn (Dalton) | 950 | 758 |
| Mw (Dalton) | 2166 | 1528 |
| Mz (Dalton) | 5848 | 4035 |

*the amount was calculated on weight percentage of the other ingredients.

Here, the molecular weight parameters decreased using an additional amount of chain transfer agent.

Example 4.b. Use of Additional Chain Transfer Agent in Case too much (di)-Cyclodiolefins are Added to the Polymerization Feed.

It is possible that the added amount of dicyclodiolefins and cyclodiolefins is too high. The following table illustrates that the molecular weight parameters can be decreased by using an additional amount of chain transfer agent. The amount of chain transfer agent is given in the following table as a fraction of total monomers as C4's. In this case pure isobutylene was used. For this example experiments were chosen in which the C5 and C6 olefins and diolefins originated from a isoprene stream. The aromatic part originated from a methylindene-rich C9 HBR resin oil and the dicyclodiolefins and cyclodiolefins originated from a mixture of cyclopentadiene and dicyclopentadiene. The given softening points were stripped to potential softening points.

| Experiment | Resin 18 | Resin 5 (stripped to pot.) |
|---|---|---|
| isoprene 65 | 12.5 | 12.5 |
| HBR C9 resin oil | 23.0 | 23.0 |
| CPD/DCPD (1:1) | 9.0 | 9.0 |
| diluent | 55.0 | 55.0 |
| addition isobutylene | | 3.0* |
| C4's | | 0.08 |
| allphatics | 0.26 | 0.22 |
| aromatics | 0.46 | 0.43 |
| cyclic diolefins | 0.28 | 0.25 |
| R&B (° C.) | 105.5 | 97.0 |
| MMAP (° C.) | 31 | 31 |
| color (Gardner) | 9.2 | 9.4 |
| Mn (Dalton) | 548 | 624 |
| Mw (Dalton) | 1271 | 1239 |
| Mz (Dalton) | 5209 | 3505 |

*the amount was calculated on weight percentage of the other ingredients.

The molecular weight parameters decreased using an additional amount of chain transfer agent to the preferred value below 5000 Dalton.

Finally, although the invention has been described with regard to particular means, materials and embodiments, it should be noted that the invention is not limited to the particulars disclosed, and extends to all equivalents with the scope of the claims.

What is claimed is:

1. An aromatic modified aliphatic hydrocarbon resin, characterized in that the resin has a Ring and Ball (R&B) softening point of 94° C. or lower, a weight-average molecular weight $M_w$ of not more than 2000 Dalton, a Z-average molecular weight ($M_z$) of not more than 6000 Dalton and a mixed methylcyclohexane aniline cloud point (MMAP) between 25 and 45° C. and further characterized in that the resin is obtained by subjecting a polymerization feed comprising a petroleum feed to a Friedel-Crafts polymerization wherein said petroleum feed comprises (a) C5 and C6 olefins and/or diolefins including cycloolefins in an amount of 45 wt % +/–25 wt % of the petroleum feed, (b) aromatic monomers in an amount 40 wt % +/–20 wt % of the petroleum feed, and (c) (di-)cyclodiolefins in an amount of 20 wt % +/–10-wt % of the petroleum feed.

2. An aromatic modified aliphatic hydrocarbon resin according to claim 1, characterized in that the resin has an R&D softening point of from 75 to 94° C.

3. An aromatic modified aliphatic hydrocarbon resin according to claim 1, characterized in that the resin has an Mw of 1000 Dalton or more and an Mz of 2500 Dalton or more.

4. An aromatic modified aliphatic hydrocarbon resin according to claim 3, characterized in that the resin has an Mw of from 1200 to 2000 Dalton and an Mz of from 3000 to 5000 Dalton.

5. An aromatic modified aliphatic hydrocarbon resin according to claim 1, characterized in that the resin has an MMAP of from 30 to 40° C.

6. An aromatic modified aliphatic hydrocarbon resin according to claim 1, characterized in that (a) is an isoprene or an isoprene-rich piperylene stream, (b) a methylindene-rich stream and (c) a (di-)cyclodiolefin stream.

7. An aromatic modified aliphatic hydrocarbon resin according to claim 1, characterized in that the petroleum feeds are contained in an amount of 20 to 60 wt. % in the polymerization feeds, the remainder being a diluent or a chain transfer agent.

8. A method for preparing an aromatic modified aliphatic hydrocarbon resin comprising the steps of obtaining polymerization feeds containing petroleum feeds which comprise (a) C5 and C6 olefins and/or diolefins including cycloolefins, (b) aromatic monomers and (c) (di-)cyclodiolefins, subjecting the polymerization feeds to a Friedel-Crafts polymerization catalyzed by an aluminum chloride containing catalyst, wherein the C5 and C6 olefins and/or diolefins including cycloolefins and the aromatic monomers are used in an amount so that the resin has an MMAP between 25 and 45° C.;

and said (di-) cyclodiolefins are used in an amount so that the resin has an $M_w$ of not more than 2000 Dalton and an $M_z$ of not more than 6000.

9. A method according to claim 8, characterized in that chain transfer agents are added to the (di-)cyclodiolefins in an amount so that the resin has an Mw of not more than 2000 Dalton and an Mz of not more than 6000 Dalton.

10. A method according to claim 8, characterized in that further lower molecular weight oligomers are added to the resin to control the R&B softening point of 94° C. or less.

11. An adhesive comprising a polymer and the aromatic modified aliphatic hydrocarbon resin of claim 1.

12. The adhesive of claim 11 wherein the adhesive is a solvent based adhesive formulation.

13. The adhesive of claim 11 wherein the adhesive is a a hot melt.

14. The adhesive of claim 11 wherein the adhesive is a water-based dispersion.

15. The adhesive of claim 12 wherein the polymer is selected from the group consisting of styrene isoprene styrene block copolymers (SIS), styrene butadiene styrene block copolymers (SBS), natural rubber and acrylics.

16. The adhesive of claim 12 wherein the polymer is natural rubber.

17. An adhesive tape comprising the aromatic modified hydrocarbon resin according to claim 1.

18. An adhesive tape comprising the adhesive of claim 12.

19. An adhesive tape of claim 18 wherein the polymer comprises natural rubber.

20. The method of claim 8, characterized in that the aluminum chloride is a liquified aluminum chloride complex containing about 50 wt. % $AlCl_3$.

* * * * *